United States Patent
Guay et al.

(10) Patent No.: US 9,311,122 B2
(45) Date of Patent: Apr. 12, 2016

(54) SYSTEM AND METHOD FOR PROVIDING A SCALABLE SIGNALING MECHANISM FOR VIRTUAL MACHINE MIGRATION IN A MIDDLEWARE MACHINE ENVIRONMENT

(71) Applicant: Oracle International Corporation, Redwood Shores, CA (US)

(72) Inventors: Wei Lin Guay, Penang (MY); Bjørn Dag Johnsen, Oslo (NO)

(73) Assignee: Oracle International Corporation, Redwood Shores, CA (US)

( * ) Notice: Subject to any disclaimer, the term of this patent is extended or adjusted under 35 U.S.C. 154(b) by 306 days.

(21) Appl. No.: 13/838,502

(22) Filed: Mar. 15, 2013

(65) Prior Publication Data

US 2013/0254424 A1 Sep. 26, 2013

Related U.S. Application Data (60) Provisional application No. 61/615,731, filed on Mar. 26, 2012, provisional application No. 61/693,703, filed on Aug. 27, 2012.

(51) Int. Cl.
| | |
|---|---|
| *G06F 15/173* | (2006.01) |
| *G06F 9/455* | (2006.01) |
| *H04L 12/701* | (2013.01) |
| *G06F 9/48* | (2006.01) |
| *G06F 9/50* | (2006.01) |
| *H04L 12/24* | (2006.01) |

(52) U.S. Cl.
CPC ............ *G06F 9/455* (2013.01); *G06F 9/45558* (2013.01); *G06F 9/4856* (2013.01); *G06F 9/5077* (2013.01); *H04L 41/0816* (2013.01); *H04L 45/00* (2013.01); *G06F 2009/4557* (2013.01)

(58) Field of Classification Search
USPC ......... 709/223, 238, 249, 203, 217, 219, 224; 710/316; 711/1; 718/1
See application file for complete search history.

(56) References Cited

U.S. PATENT DOCUMENTS

| | | | |
|---|---|---|---|
| 7,093,024 B2 * | 8/2006 | Craddock et al. ............. | 709/249 |
| 8,150,971 B2 | 4/2012 | Lublin et al. | |
| 8,396,986 B2 | 3/2013 | Kanada et al. | |
| 8,407,182 B1 | 3/2013 | Rajaa et al. | |
| 8,429,647 B2 | 4/2013 | Zhou et al. | |
| 8,700,811 B2 | 4/2014 | Oshins et al. | |
| 8,862,538 B2 | 10/2014 | Patil et al. | |

(Continued)

OTHER PUBLICATIONS

Clark, et al., Live Migration of Virtual Machines, Proceedings of the Symposium on Networked Systems Design and Implementation, Jan. 1, 2005, pp. 273-286, USENIX Association, Berkeley, CA, USA. Relevant pages: Abstract; Section 3.1.

(Continued)

*Primary Examiner* — Quang N Nguyen
(74) *Attorney, Agent, or Firm* — Tucker Ellis LLP (57) ABSTRACT

A system and method can support a signaling method in a virtualization environment. The management domain on one or more physical servers can be provided with a mapping table. The management domain operates to receive a message from the subnet administrator, wherein the message indicates a path record change event, such as a virtual machine (VM) migration event in the network. Then, the management domain can forward the received message to one or more virtual machine associated with the management domain based on the mapping table.

19 Claims, 4 Drawing Sheets

(56) References Cited

U.S. PATENT DOCUMENTS

| | | |
|---|---|---|
| 8,935,506 B1 | 1/2015 | Gopalan |
| 2003/0120852 A1* | 6/2003 | McConnell et al. .......... 710/316 |
| 2003/0208572 A1* | 11/2003 | Shah et al. ................... 709/223 |
| 2004/0215848 A1 | 10/2004 | Craddock et al. |
| 2005/0100033 A1 | 5/2005 | Arndt et al. |
| 2005/0120160 A1* | 6/2005 | Plouffe et al. .................... 711/1 |
| 2006/0230185 A1 | 10/2006 | Errickson et al. |
| 2008/0189432 A1* | 8/2008 | Abali et al. ................... 709/238 |
| 2010/0153514 A1 | 6/2010 | Dabagh et al. |
| 2010/0169494 A1 | 7/2010 | Machulsky et al. |
| 2010/0332657 A1 | 12/2010 | Elyashev et al. |
| 2011/0119427 A1 | 5/2011 | Dow et al. |
| 2011/0246669 A1 | 10/2011 | Kanada et al. |
| 2012/0042034 A1 | 2/2012 | Goggin et al. |
| 2012/0173757 A1 | 7/2012 | Sanden |
| 2012/0233282 A1 | 9/2012 | Voccio et al. |
| 2012/0287931 A1 | 11/2012 | Kidambi et al. |
| 2012/0291024 A1* | 11/2012 | Barabash et al. ................. 718/1 |
| 2012/0291028 A1 | 11/2012 | Kidambi et al. |
| 2013/0060947 A1 | 3/2013 | Nelson |
| 2013/0326173 A1 | 12/2013 | Tsirkin |

OTHER PUBLICATIONS

International Searching Authority, International Search Report and Written Opinion for PCT International Patent Application No. PCT/US2013/033753, Jul. 22, 2013, 10 pages.

International Searching Authority, International Search Report and Written Opinion for PCT International Patent Application No. PCT/US2013/033752, Jul. 22, 2013, 12 pages.

European Patent Office, International Searching Authority, International Search Report andWritten Opinion dated Jul. 9, 2013 for International Application No. PCT/US2013/033755, 10 pages.

European Patent Office, International Searching Authority, International Search Report and Written Opinion dated Jul. 9, 2013 for International Application No. PCT/US2013/033754, 10 pages.

* cited by examiner

SYSTEM AND METHOD FOR PROVIDING A SCALABLE SIGNALING MECHANISM FOR VIRTUAL MACHINE MIGRATION IN A MIDDLEWARE MACHINE ENVIRONMENT

CLAIM OF PRIORITY

This application claims priority on U.S. Provisional Patent Application No. 61/615,731, entitled "SYSTEM AND METHOD FOR SUPPORTING LIVE MIGRATION OF VIRTUAL MACHINES THAT USE RDMA BASED COMMUNICATION" filed Mar. 26, 2012, and U.S. Provisional Patent Application No. 61/693,703, entitled "SYSTEM AND METHOD FOR PROVIDING A SCALABLE SIGNALING MECHANISM FOR VIRTUAL MACHINE MIGRATION IN A MIDDLEWARE MACHINE ENVIRONMENT" filed Aug. 27, 2012, which applications are herein incorporated by reference.

CROSS REFERENCE TO RELATED APPLICATIONS

This application is related to the following patent applications, each of which is hereby incorporated by reference in its entirety:

U.S. patent application entitled "SYSTEM AND METHOD FOR SUPPORTING LIVE MIGRATION OF VIRTUAL MACHINES IN AN INFINIBAND NETWORK", application Ser. No. 13/837,922, filed Mar. 15, 2013;

U.S. patent application entitled "SYSTEM AND METHOD FOR SUPPORTING LIVE MIGRATION OF VIRTUAL MACHINES IN A VIRTUALIZATION ENVIRONMENT", application Ser. No. 13/838,121, filed Mar. 15, 2013; and U.S. patent application entitled "SYSTEM AND METHOD FOR SUPPORTING LIVE MIGRATION OF VIRTUAL MACHINES BASED ON AN EXTENDED HOST CHANNEL ADAPTOR (HCA) MODEL", application Ser. No. 13/838,275, filed Mar. 15, 2013.

FIELD OF INVENTION

The present invention is generally related to computer systems, and is particularly related to supporting computer system virtualization.

BACKGROUND

As larger cloud computing architectures are introduced, the performance and administrative bottlenecks associated with the traditional network and storage have become a significant problem. The InfiniBand (IB) technology has seen increased deployment as the foundation for a cloud computing fabric. This is the general area that embodiments of the invention are intended to address.

SUMMARY

Described herein are systems and methods that can support a signaling method in a virtualization environment. The management domain on one or more physical servers can be provided with a mapping table. The management domain operates to receive a message from the subnet administrator, wherein the message indicates a path record change event, such as a virtual machine (VM) migration event in the network. Then, the management domain can forward the received message to one or more virtual machine associated with the management domain based on the mapping table.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the Infiniband (IB) network as an example for a high performance network. It will be apparent to those skilled in the art that other types of high performance networks can be used without limitation. Also, the description of the invention as following uses the Xen virtualization model as an example for a virtualization model. It will be apparent to those skilled in the art that other types of virtualization models can be used without limitation.

Described herein are systems and methods that can support virtual machine (VM) live migration in a network.

In accordance with an embodiment of the invention, virtualization can be beneficial to efficient resource utilization and elastic resource allocation in cloud computing. Live migration makes it possible to optimize resource usage by moving virtual machines (VMs) between physical servers in an application transparent manner. Thus, virtualization can enable consolidation, on-demand provisioning of resources, and elasticity through live migration.

InfiniBand (IB) Architecture

The IB Architecture is a serial point-to-point full-duplex technology. The IB networks can be referred to as subnets, wherein a subnet consists of a set of hosts interconnected using switches and point-to-point links. An IB subnet can include at least one subnet manager (SM), which is responsible for initializing and bringing up the network, including the configuration of all the switches, routers and host channel adaptors (HCAs) in the subnet.

IB supports a rich set of transport services in order to provide both remote direct memory access (RDMA) and traditional send/receive semantics. Independent of the transport service used, the IB HCAs communicate using queue pairs (QPs). A QP is created during the communication setup, and can have a set of initial attributes such as QP number, HCA port, destination LID, queue sizes, and transport service that are supplied. An HCA can handle many QPs, each QP consists of a pair of queues, such as a send queue (SQ) and a receive queue (RQ), and there is one such pair present at each end-node participating in the communication. The send queue holds work requests to be transferred to the remote node, while the receive queue holds information on what to do with the data received from the remote node. In addition to the QPs, each HCA has one or more completion queues (CQs) that are associated with a set of send and receive queues. The CQ holds completion notifications for the work requests posted to the send and receive queue. Even though the complexities of the communication are hidden from the user, the QP state information is kept in the HCA.

Input/Output (I/O) Virtualization

I/O Virtualization (IOV) can provide availability of I/O by allowing VMs to access the underlying physical resources. The combination of storage traffic and inter-server communication impose an increased load that may overwhelm the I/O resources of a single server, leading to backlogs and idle processors as they are waiting for data. With the increase in number of I/O requests, IOV can provide availability; and can improve performance, scalability and flexibility of the (virtualized) I/O resources to match the level of performance seen in modern CPU virtualization.

There can be different types of IOV technologies, such as emulation, paravirtualization, direct assignment (DA), and single root-I/O virtualization (SR-IOV). Among these IOV technologies, SR-IOV can extend the PCI Express (PCIe) specification with the means to allow direct access to a single physical device from multiple VMs while maintaining near to native performance. Thus, SR-IOV can provide good performance and scalability.

SR-IOV allows a PCIe device to expose multiple virtual devices that can be shared between multiple guests by allocating one virtual device to each guest. Each SR-IOV device has at least one physical function (PF) and one or more associated virtual functions (VF). A PF is a normal PCIe function controlled by the virtual machine monitor (VMM), or hypervisor, whereas a VF is a light-weight PCIe function. Each VF has its own base address (BAR) and is assigned with a unique requester ID that enables I/O memory management unit (IOMMU) to differentiate between the traffic streams to/from different VFs. The IOMMU also apply memory and interrupt translations between the PF and the VFs.

There can be different types of SR-IOV models, e.g. a shared port model and a virtual switch model. In the shared port model, all the VFs can share a single port address and a single QP name space, and only a single HCA port is exposed to the network. In the virtual switch model, each VF is a virtual HCA that contains a unique port address and a unique QP name space, and one HCA for each VF on the device is exposed to the network. Thus, the virtual switch model can simplify IOV with more complex hardware.

The use of an SR-IOV capable device can yield near native performance and improved scalability. On the other hand, SR-IOV may not be fully incompatible with live migration and check-point/restart mechanisms.

Hardware Address Assignment and Virtual Machine (VM) Live Migration

In accordance with an embodiment of the invention, each physical IB device can be assigned with two addresses: a local identifier (LID), which can be used to route IB packets within a subnet, and a globally unique identifier (GUID), which can be used to route IB packets between different subnets. Furthermore, the GUID is the hardware address that can uniquely represent a physical IB device in an IB network.

In the shared port model, which is used to implement SR-IOV for an IB network, each VF can have its own virtual GUID (vGUID) and can share the LID with the PF on the physical server. Here, each virtual GUID (vGUID) is a hardware address that can uniquely represent a VF.

Figure 1:
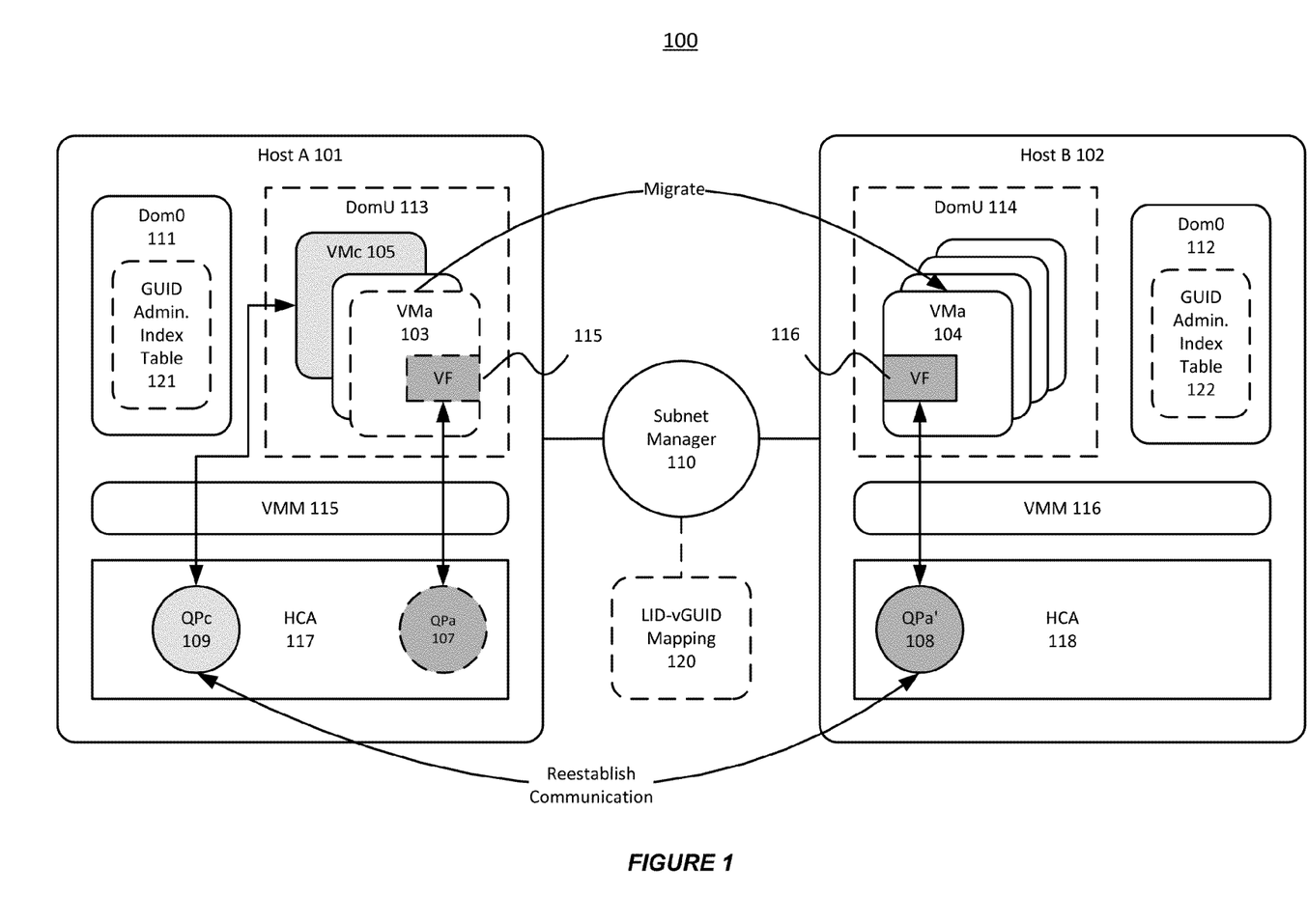
FIG. 1 shows an illustration of the live migration of a virtual machine in a virtualization environment, in accordance with an embodiment of the invention.

FIG. 1 shows an illustration of the live migration of a virtual machine in a virtualization environment, in accordance with an embodiment of the invention. As shown in FIG. 1, an IB network 100 can include a subnet manager (SM) 110, and a plurality of hosts, e.g. hosts A-B 101-102.

Each host can include a VMM that uses a HCA and supports a management domain (or a privileged domain) that manages one or more virtual machines (VMs) in a user domain. As shown in FIG. 1, host A 101 includes VMM A 115 that uses a HCA 117, and VMM A 115 can support a Dom0 111 that manages DomU 113. Also, host B 102 includes VMM B 116 that uses a HCA 118, and VMM B 116 can support a Dom0 112 that manages DomU 114.

In accordance with an embodiment of the invention, there can be a one-to-one relationship between a VM and a guest domain (i.e. DomU) in a virtualization model, such as the Xen model. Furthermore, the DomU, which is a resource container on the physical server that hosts a VM under the control of the VMM/Dom0, can be used to represent a Xen notion of a VM. Additionally, one-to-many, or many-to-one relationship may be existing between the VMs and the guest domains in other virtualization models without limitation. For example, a guest domain may be able to host different VMs.

A VM, e.g. VMa 103 can migrate from a host, e.g. host A 101, to another host, e.g. host B 102 (as VMa 104). Before the migration, VMa 103 can be attached with a VF, e.g. VF 115, which is connected to a queue pair, e.g. QPa 107. Additionally, VMa 103 can be in communication with VMc 105 that is associated with QPc 109. After the migration, VMa 104 can be attached with a new VF, e.g. VF 116, which is connected to a queue pair, e.g. QPa' 108, that can reestablish the communication with QPc 109.

In accordance with an embodiment of the invention, different hardware address assignment models can be used to assign vGUID for a VF, e.g. VF 115.

In one example, the subnet manager (SM) 110 can use a dynamic assignment model to assign the vGUID for VF 115, in addition to assigning the LID and GUID for the PF on Dom0 111. The dynamic assignment model is similar to how addresses are assigned in the native IB.

During the subnet initialization, the PF on Dom0 111 can query the SM 110 for the vGUIDs that may be allocated to it's VFs, such as VF115. Accordingly, the SM 110 can generate the corresponding vGUIDs and can respond to the requesting PF. Then, the PF can store the received vGUIDs in the GUID administration index table 121 in Dom0 111, with each VF associated with an appointed index in the GUID administration index table 121.

Using the dynamic assignment model, the relation between an assigned VF and a VM is not constant. As shown in FIG. 1, after the migration of VMa 103 from host A 101 to host B 102, a new VF 116 from the destination server, i.e. host B 102, can be assigned to the VMa 104. As a result, the vGUID associated with VMa 104 changes because it is obtained from the GUID administration index table 122 in Dom0 112 of the host B 102.

The dynamic assignment model is simple, because it uses the SM 110 to assign the addresses for both the VF and the PF. On the other hand, the vGUID associated with the VMa 103 may not be preserved after VM migration. Then, a query to the subnet administrator (SA) (e.g. on the subnet manager (SM) 110) may need to be performed after VM migration in order to obtain the path information for the new vGUID. If the vGUID is not fixed for the VM, it may also be necessary to rediscover the vGUID currently used by a remote VM before path information can be obtained from the SA. Such mapping may include using address resolution protocol (ARP) operations where the hardware address associated with an IP address can be determined. These operations may introduce additional latency in bringing up the IB VF. Especially, this delay may increase the total service downtime when live migration is performed.

In another example, the subnet manager (SM) 110 can use a static assignment model to assign a vGUID for VF 115. The static assignment model, which can preserve the vGUID that is assigned to a VM regardless of location, is more complex and is different from the native IB address assignment. In order to have a static vGUID throughout the VM life cycle, the static assignment model can be based on the SM 110, or on a combination of the SM and the privileged domain (dom0). (The approach combining the SM and dom0 is a preferred solution, since excessive management messages may be generated when only using the SM to maintain a static vGUID.)

Using the static assignment model, when a VM, e.g. VMa 103 is instantiated, it is assigned with a vGUID that is kept as part of the VM configuration. When a VF, e.g. VF 115, is attached to the VMa 103, the Dom0 111 can read the vGUID from the VM configuration and writes the vGUID to the GUID administration index table 121. This event can also trigger a management message for updating the SM 110 with the latest vGUID to LID mapping 120.

After the migration of VMa 103 from host A 101 to host B102, the attached VF 116 of the VMa 104 can preserve the vGUID that is associated with the attached VF 115 of the VMa 103.

In accordance with an embodiment of the invention, the static assignment model may need further enhancement in order to support the VM live migration. As shown in FIG. 1, VMc 105, which is a communication peer of the migrated VMa 103, may not be aware of the change in the LID to vGUID mapping. VMc 105 may continue to communication with the migrated VMa 103 using its outdated cached path information. As a result, the peers may fail to reach the migrated VMa 104 at the new location.

This is because the new VF 116, from the destination server with a different LID, is attached to the migrated VMa 104, even through the vGUID associated with the migrated VMa 104 remains the same. Additionally, VMc 105 may not be notified the updated path information, even though the SM 110 and the migrated VMa 104 have the updated LID to vGUID pair. Thus, the migrated VM peers may fail to reach the migrated VM, since the cached LID to vGUID pair in the migrated peers that was established earlier has become invalid.

Signaling Mechanism

In accordance with an embodiment of the invention, a signaling mechanism that maintains the network connectivity after VM migration can be implemented. Furthermore, the signaling method can be optimized so that a same event may only be forwarded once to a physical server regardless of the hosted VMs, in order to reduce the management message overhead.

Figure 2:
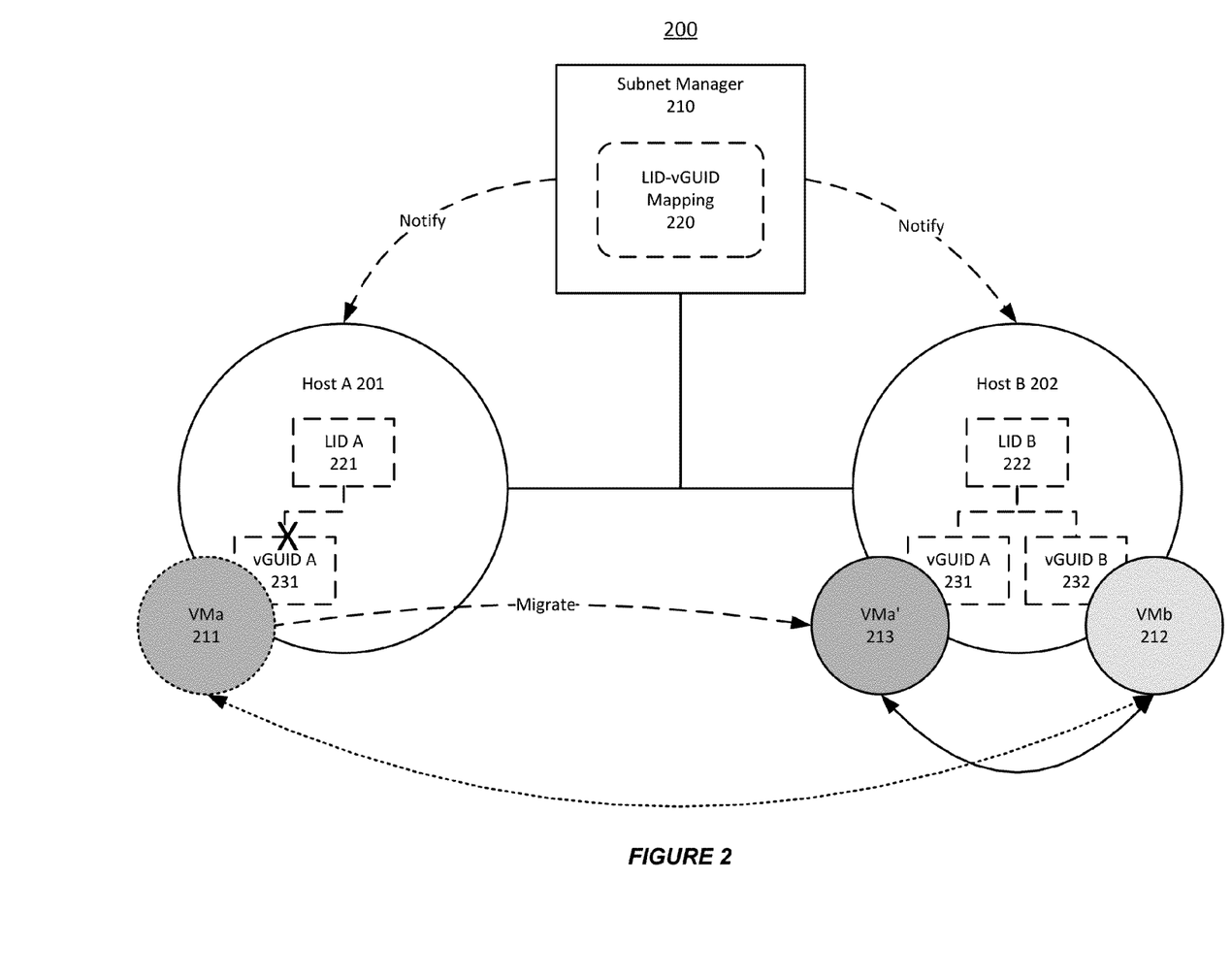
FIG. 2 shows an illustration of supporting a signaling method in a virtualization environment, in accordance with an embodiment of the invention.

FIG. 2 shows an illustration of supporting a signaling method in a virtualization environment, in accordance with an embodiment of the invention. As shown in FIG. 2, an IB network 200 can include a subnet manager (SM) 210, and a plurality of hosts, e.g. hosts A-B 201-202. A VM, e.g. VMa 211, which is in communication with a peer VMb 212, can migrate from a host, e.g. host A 201, to another host, e.g. host B 202 (as VMa' 213).

As shown in FIG. 2, before the live migration, VMa 211 can be assigned with a vGUID A 231, and shares a LID A 221 with other VMs on host A 201. The SM 210 can maintain such a relationship as an entry in the LID-vGUID mapping table 220.

Using the static assignment model, after the live migration of the VMa 211, VMa' 213 can preserve the vGUID A 231 and shares a different LID B 222 with other VMs on host B 202. A repath/unpath notice can be used to update the LID/vGUID mapping 220 in the SM 210, e.g. at the SA agent cache. The SM 210 can detect such change or event in the IB network 200 and can update the LID-vGUID mapping table accordingly.

Furthermore, the SM 210 can notify the communication peers about the updated path information. For example, the SM 210 can notify VMb 212 on host B about the migration of VMa 211, and the change in the LID-vGUID mapping 220, using repath/unpath notices.

Figure 3:
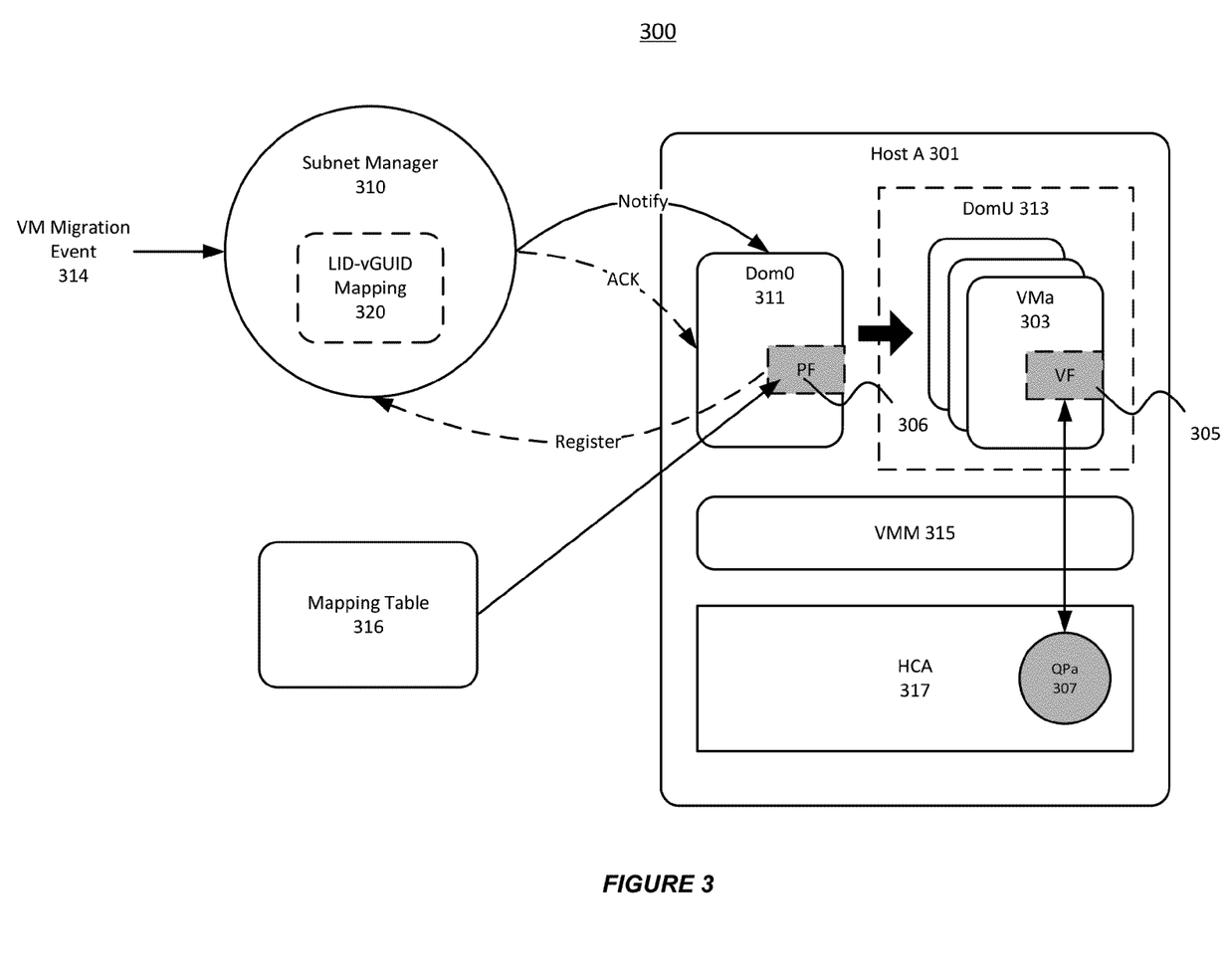
FIG. 3 shows an illustration of implementing a signaling method in a virtualization environment, in accordance with an embodiment of the invention.

FIG. 3 shows an illustration of implementing a signaling method in a virtualization environment, in accordance with an embodiment of the invention. As shown in FIG. 3, an IB network 300 can include a subnet manager (SM) 310, and a host A 301, which includes a virtual machine monitor (VMM) 315 and a host channel adaptor (HCA) 317. The VMM 315 can support a management domain (or a privileged domain), Dom0 311, that manages one or more virtual machines (VMs) in a user domain, DomU 313.

Furthermore, the system can configure all management datagram (MAD) traffic to be tunneled through a physical function (PF) associated with the management domain. As shown in FIG. 3, a privilege domain, e.g. Dom0 311 on the host A 301, which include includes a PF 306, can support a plurality of virtual machines (VMs), e.g. VMa 303. Additionally, the VMa 303 can be attached with a VF 305 that is associated with a QPa 307. Additionally, VMa 303 can be in communication with a peer VM (not shown), which may be able to perform a live migration within the IB network 300 (as shown as a VM migration event 314).

In accordance with an embodiment of the invention, the signaling method can include two phases: an event registration phase and an event forwarding phase.

In the event registration phase, each physical server can register for the repath event notification. As shown in FIG. 3, the host A 301 can register with the subnet manager (SM) 310, or a subnet administrator (SA), using its physical port GUID associated with its PF 306. Then, the subnet manager (SM) 310 can acknowledge (ACK) the physical server, i.e. the host A 301, after the physical port GUID is registered successfully in the SM 310.

The event forwarding phase can be performed when the VM migration happens 314. The SM 310 can detect the changes in the LID-vGUID mapping 320 and notify all registered servers. For example, the SM 310 can signal a repath trap that has the latest LID-vGUID mapping, to all registered servers, including host A 301. Then, the management domain, Dom0 311, on the host A 301 can forward the received notice to interested VMs, based on registered GUID in the mapping table 316.

In order to avoid triggering the repath trap during a new VM creation or a VM reboot event (when the VM is shutdown and restarted at the same server), the following algorithm 1 can be used by the SM 310 to identify the changes in the LID to vGUID mapping 320.

---

Algorithm 1 Trigger re-path trap with path record

1: if delete_guid(path_rec.guid) then
2:   add_to_trap_table(path_rec)
3: else if set_guid(path rec.guid) then -continued Algorithm 1 Trigger re-path trap with path record

```
    4:      if ret_rec=find_trap_table(path_rec.guid) then
    5:          if ret rec.dlid != path_rec.dlid then
    6:              construct_repath_notice(ret_rec)
    7:              signal_repath_trap(notice)
    8:          end if
    9:          remove_from_trap_table(path_rec)
   10:     end if
   11: end if
```

When a vGUID is deleted from the SM 310 due to VM shutdown or VM migration, the path information can be added to a repath trap table, which is a temporary storage that can be used to differentiate between the VM creation event and the VM migration event. If a vGUID is already existed in the repath trap table when it is added to the SM 310, the associated path information is compared with the entry in the repath trap table. If LID is different, this indicates that a VM migration has happened. Then, this newly added vGUID and its associated path information can be encapsulated in the repath trap, which can be signaled to all registered servers including host A 301. Afterwards, the vGUID entry in the repath trap table can be removed.

In order to avoid creating a bottleneck in the SM 310, the physical port GUID (i.e. the GUID for Dom0 311 instead of the vGUID for VF 305) can be used for event subscription with the SM 310. Then, Dom0 311 can be responsible for broadcasting the received notice to the VMs that it hosts.

The following algorithm 2 shows the implementation in Dom0 311 to forward the received repath trap notice to the active VMs.

Algorithm 2 Forward the repath notice to VMs

```
   1: if is_repath_trap_notice(notice) then
   2:     for i = 0 to max_supported_VFs do
   3:         if guid_cache[i] != NULL then
   4:             ib_send_to_slave(notice)
   5:         end if
   6:     end for
   7: end if
```

By only using the physical port GUID for event subscription, the generated management message (MMO) can be reduced.

Furthermore, the following algorithm 3 can be executed to reconfigure the cached path information, when the notice, which is forwarded by the Dom0 311, is received by each VM resided in a host.

Algorithm 3 Reconfigure the cached path record

```
   1: if received repath trap notice(notice) then
   2:     rec = get SAagent cache(notice.path rec.gid)
   3:     if rec.dlid != notice.path rec.dlid then
   4:         update SAagent cache(notice.path rec)
   5:     end if
   7: end if
```

For example, the host A 301 can extract its cached path information and compare them with the encapsulated path record in the repath trap. If there is a matched vGUID entry but with a different LID, the cached path information in the host stack can be updated.

Thus, the subnet manager (SM) 301 can track the complete life cycle of VMs based on the associated vGUID(s). For example, the subnet manager (SM) 301 can keep track of the current location of each VM and can notify relevant communication peers whenever a VM is being migrated and may need new address information using optimized hierarchical algorithms that reduces overhead and improves scaling.

Furthermore, other features, such as suspended state and migration states of a VM/vHCA, can be reflected to interested parties independently of whether the vGUID is currently associated with any fabric end-point or not.

Figure 4:
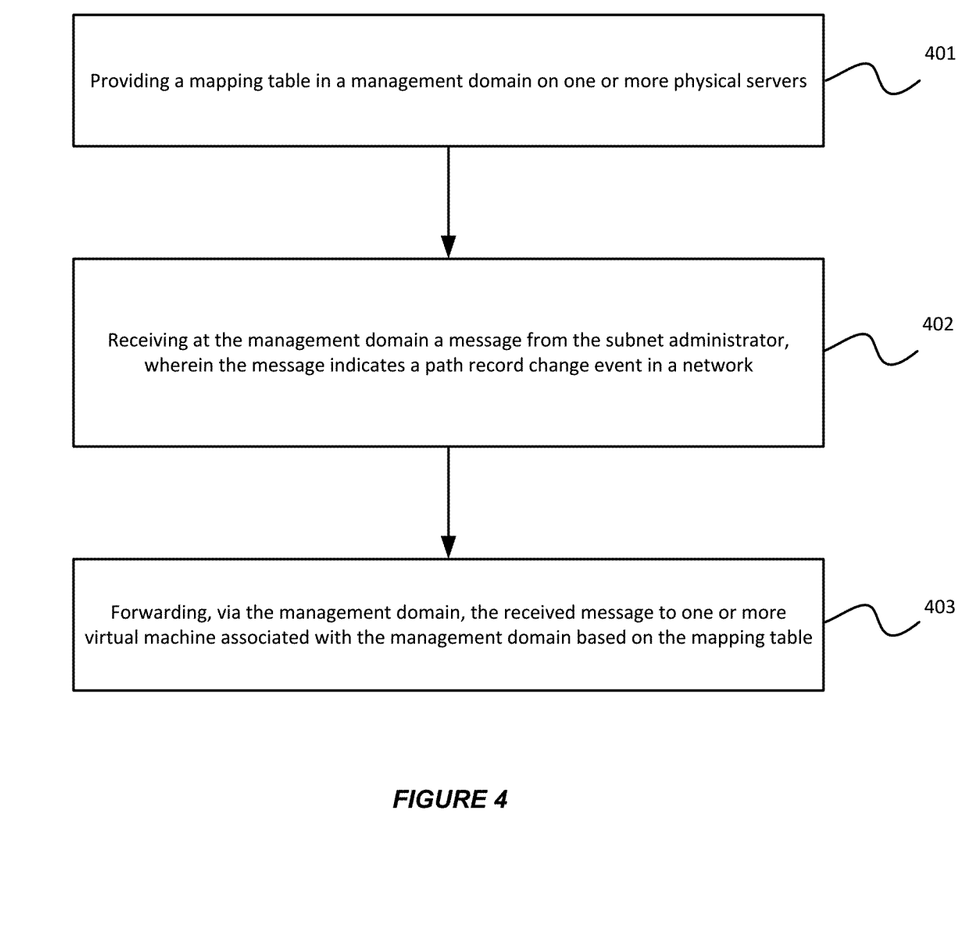
FIG. 4 illustrates an exemplary flow chart for supporting the live migration of a virtual machine in a virtualization environment, in accordance with an embodiment of the invention.

FIG. 4 illustrates an exemplary flow chart for supporting the live migration of a virtual machine in a virtualization environment, in accordance with an embodiment of the invention. As shown in FIG. 4, at step 401, the system can provide a mapping table in a management domain on one or more physical servers. Then, at step 402, the management domain can receive a message from the subnet administrator, wherein the message indicates a path record change event, such as a virtual machine (VM) migration event in the network. Furthermore, at step 403, the management domain can forward the received message to one or more virtual machine associated with the management domain based on the mapping table The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting a signaling method in a virtualization environment, comprising:
   providing a mapping table in a management domain on one or more physical servers;
   associating each of a plurality of hosts in a network with its own local identifier;
   associating a virtual machine that can execute within the plurality of hosts, with a virtual global unique identifier;
   receiving, at the management domain, a message which indicates a path record change event in the network, indicative of a migration of the virtual machine from a first host having a first local identifier, to an other host having a second local identifier;
updating the mapping table, based on the received message, to indicate the change in the local identifier to virtual global unique identifier mapping for the virtual machine; and
forwarding a notification to one or more other virtual machines associated with the management domain, based on the mapping table; wherein
during an event registration phase, the one or more physical servers can register for path event notifications using a physical port global unique identifier; and
during an event forwarding phase performed upon the migration of the virtual machine, the change in the local identifier to virtual global unique identifier mapping for the virtual machine is detected and notified to all registered servers, wherein the management domain then forwards the received notification to the one or more other virtual machines.

2. The method according to claim 1, further comprising:
subscribing to a subnet administrator for receiving the message indicating the path record change event in the network.

3. The method according to claim 1, further comprising:
updating the mapping table in the management domain when a user domain is added.

4. The method according to claim 1, further comprising:
using a repath/unpath notice to update the local identifier to virtual global unique identifier (LID-vGUID) mapping at an agent cache of a subnet administrator.

5. The method according to claim 1, further comprising:
configuring all management datagram (MAD) traffic to be tunneled through a physical function associated with the management domain.

6. The method according to claim 1, further comprising:
preserving the virtual global unique identifier (vGUID) associated with the virtual machine (VM), after the VM migrates from the first host to the other host, wherein the VM is in communication with a peer VM after the VM is migrated.

7. The method according to claim 6, further comprising:
forwarding the message that encapsulates a latest path record to the peer VM.

8. The method according to claim 1, further comprising:
allowing each physical server to use their physical port global unique identifier (GUID) for the repath notification.

9. The method according to claim 1, further comprising:
differentiating between a VM creation event and a VM migration event.

10. A system for supporting a signaling method in a virtualization environment, comprising:
one or more physical servers including one or more microprocessors, wherein said one or more physical servers include a management domain provided with a mapping table, and wherein the management domain operates to
associate each of a plurality of hosts in a network with its own local identifier;
associate a virtual machine that can execute within the plurality of hosts, with a virtual global unique identifier;
receive a message which indicates a path record change event in the network, indicative of a migration of the virtual machine from a first host having a first local identifier, to an other host having a second local identifier;
update the mapping table, based on the received message, to indicate the change in the local identifier to virtual global unique identifier mapping for the virtual machine; and
forward a notification to one or more other virtual machines associated with the management domain, based on the mapping table; wherein
during an event registration phase, the one or more physical servers can register for path event notifications using a physical port global unique identifier; and
during an event forwarding phase performed upon the migration of the virtual machine, the change in the local identifier to virtual global unique identifier mapping for the virtual machine is detected and notified to all registered servers, wherein the management domain then forwards the received notification to the one or more other virtual machines.

11. The system according to claim 10, wherein:
said one or more physical servers operates to subscribe to a subnet administrator for receiving the message indicating the path record change event in the network.

12. The system according to claim 10, wherein:
said one or more physical servers operates to update the mapping table in the management domain when a user domain is added.

13. The system according to claim 10, wherein:
said one or more physical servers operates to use a repath/unpath notice to update the local identifier to virtual global unique identifier (LID-vGUID) mapping at an agent cache of a subnet administrator.

14. The system according to claim 10, wherein:
said one or more physical servers operates to configure all management datagram (MAD) traffic to be tunneled through a physical function associated with the management domain.

15. The system according to claim 10, wherein:
said one or more physical servers operates to preserve the virtual global unique identifier (vGUID) associated with the virtual machine (VM), after the VM migrates from the first host to the other host, wherein the VM is in communication with a peer VM after the VM is migrated.

16. The system according to claim 15, wherein:
the message that encapsulates a latest path record is forwarded to the peer VM.

17. The system according to claim 10, wherein:
each physical server uses their physical port global unique identifier (GUID) for the repath notification.

18. The system according to claim 10, wherein:
the system operates to differentiate between a VM creation event and a VM migration event.

19. A non-transitory machine readable storage medium having instructions stored thereon that when executed cause a system to perform the steps comprising:
providing a mapping table in a management domain on one or more physical servers;
associating each of a plurality of hosts in a network with its own local identifier;
associating a virtual machine that can execute within the plurality of hosts, with a virtual global unique identifier;
receiving, at the management domain, a message which indicates a path record change event in the network, indicative of a migration of the virtual machine from a first host having a first local identifier, to an other host having a second local identifier;

updating the mapping table, based on the received message, to indicate the change in the local identifier to virtual global unique identifier mapping for the virtual machine; and forwarding a notification to one or more other virtual machines associated with the management domain, based on the mapping table; wherein during an event registration phase, the one or more physical servers can register for path event notifications using a physical port global unique identifier; and during an event forwarding phase performed upon the migration of the virtual machine, the change in the local identifier to virtual global unique identifier mapping for the virtual machine is detected and notified to all registered servers, wherein the management domain then forwards the received notification to the one or more other virtual machines.

\* \* \* \* \*